United States Patent [19]

Graham et al.

[11] 4,386,171

[45] May 31, 1983

[54] PAINT FORMULATION AND METHOD

[75] Inventors: Thomas Graham, Clitheroe; Frank B. Redman, Edgeworth; Cyril J. Surtees, Darwen, all of England

[73] Assignee: Reed International Limited, London, England

[21] Appl. No.: 272,002

[22] Filed: Jun. 9, 1981

[30] Foreign Application Priority Data

Jun. 13, 1980 [GB] United Kingdom ............... 8019402

[51] Int. Cl.$^3$ .................... C09D 3/64; C09D 5/02
[52] U.S. Cl. .................... 523/337; 106/170; 106/300; 523/502; 524/601; 524/605
[58] Field of Search ............ 106/170, 300; 260/22 M, 260/22 R, 29.2 E, 29.6 MM; 523/337, 502; 524/601, 605

[56] References Cited

U.S. PATENT DOCUMENTS

| | | | |
|---|---|---|---|
| 2,198,669 | 4/1940 | Jenett et al. | 106/170 |
| 2,220,685 | 11/1940 | Myers et al. | 523/502 |
| 2,372,756 | 4/1945 | Auer et al. | 106/170 |
| 2,424,458 | 7/1947 | Heijmer | 260/22 R |
| 3,442,842 | 5/1969 | Von Bonin | 260/29.2 E |
| 3,728,142 | 4/1973 | Rudolph et al. | 106/300 |
| 3,755,244 | 8/1973 | Hart | 523/333 |
| 3,847,640 | 11/1974 | Daudenspeck et al. | 106/300 |
| 4,025,483 | 5/1977 | Ramig | 260/29.6 MM |
| 4,062,692 | 12/1977 | Hemmerich et al. | 106/300 |
| 4,214,913 | 7/1980 | Glaeser | 106/300 |
| 4,284,547 | 8/1981 | Sulick | 260/29.6 MM |

FOREIGN PATENT DOCUMENTS

| | | |
|---|---|---|
| 575448 | 2/1946 | United Kingdom . |
| 1227135 | 4/1971 | United Kingdom . |
| 1342313 | 1/1974 | United Kingdom . |
| 1475348 | 6/1977 | United Kingdom . |
| 1517767 | 7/1978 | United Kingdom . |
| 1533598 | 11/1978 | United Kingdom . |
| 1540210 | 2/1979 | United Kingdom . |

OTHER PUBLICATIONS

American Paints and Coatings Journal, 18th Feb. 1980 issue, pp. 55 & 56.
Official Digest, Federation of Paint and Varnish Production Clubs, No. 384, vol. 29, pp. 37–40.

*Primary Examiner*—Ronald W. Griffin
*Attorney, Agent, or Firm*—William R. Hinds

[57] ABSTRACT

A paint formulation which is a dispersion of a water phase in an oil phase, said oil phase comprising a polymeric paint vehicle and organic volatiles characterized in that the water content is selected to give a solids level for the formulation of 50% to 75% by weight with an organic volatiles content of less than 22% and preferably in the range of 5% to 20% by weight and the dispersion is stabilized with titanium dioxide.

15 Claims, 2 Drawing Figures

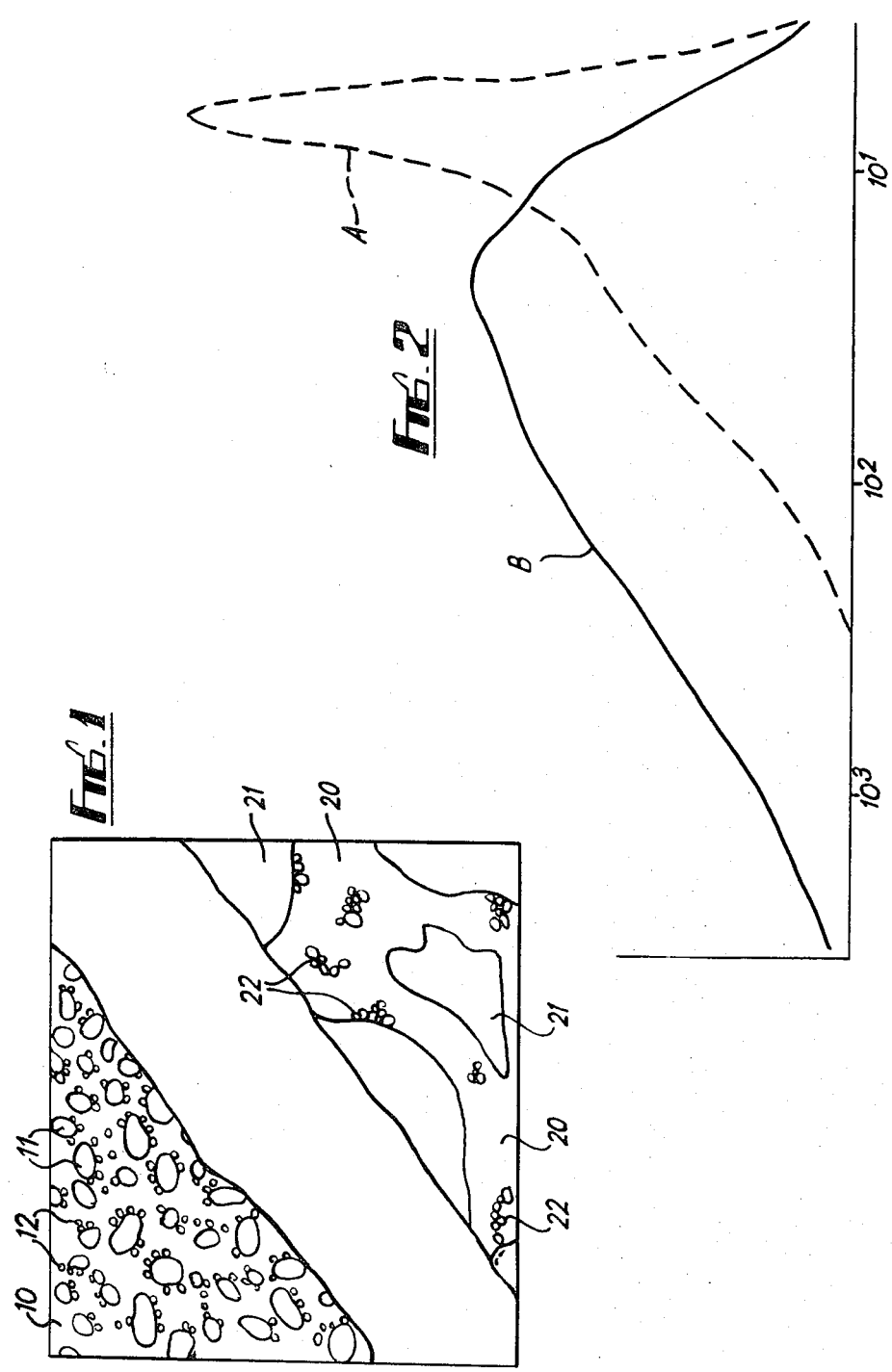

PAINT FORMULATION AND METHOD

The invention relates to improvements in surface coatings that are normally carried in organic solvents, conveniently termed "paint formulations". Conventional paint formulations comprise a vehicle, pigment, volatile thinner, and various modifying additives, the vehicle and pigment providing what is commonly referred to as the "solids" in the formulation. The conventional percentage solids varies from one formulation to another depending on type (gloss, undercoat, eggshell, matt, thixotropic, primers, wood stain, industrial finishes for metal, wood, etc.) on shade and on country. In general solids lie in the range of 50%–75%, and the viscosity is then in the range of 0.5–6.0 poise. Such a paint can be used by professional or amateur, or be machine applied, to produce a high quality, durable paint film.

Traditionally, vehicles have been designed for a specific application and the paints have been formulated so as to achieve a solids content that is convenient and efficient for its intended purpose.

If the solids content is lowered the product is cheapened, the dry coating weight is reduced and the protective properties are consequently decreased. This is seen for example in known water extended gloss paints in which the solid content is reduced to about 45%.

If the solids content is increased (typically 90%) the cost is raised and the paint tends to deposit undesirably and unnecessarily thick dry coatings (apart from specialised industrial use such paints tend not to be produced). It is, therefore, very desirable to maintain the conventional (50–75%) solids level but the consequent organic solvent content is then objectionably high.

Additionally, most organic solvent carried decorative paints in current use are alkyd based, the alkyd being manufactured by a preferred "solvent process" which results in an undesirable residue, such as xylene, which is 100% aromatic, and can be regarded as another objectionable organic substance. Its odour, which is very objectionable and penetrating, being noticeable when only low (typically up to 5% on the resin) levels are present.

The current legislation approach on the subject of organic solvents in paints is evidenced by the following:

(i) In USA: the California Air Resources Board (CARB) have introduced a regulation (Regulation 1113) prohibiting the sale and use of paints containing more than a specified small quantity of organic solvent. Many other States in the USA are likely to follow this regulation.

(ii) In Sweden: a YSAM scheme of classifying paints on type and quantity of solvent is creating a demand for those having a low solvent content.

(iii) In France and Italy: recommended restrictions exist on the aromatic content of mineral spirit (white spirit) used in certain paints.

(iv) In UK: the Health and Safety Executive have carried out controlled tests on the organic solvent present in the atmosphere during painting. This has caused one brand of paint to be withdrawn from sale as giving, in normal use, more than 100 p.p.m. (Threshold Limit Value:time weighted average for white spirit) solvent and the Executive are proposing a mechanical ventilation requirement in a new Code of Practice for Painting of Buildings to reduce the solvent concentration in the atmosphere.

Thus, at the present time, paint manufacturers are faced with the problem of meeting very demanding requirements, which are expected to become even more demanding, whilst continuing to produce a marketable product of not inferior quality and stability having those qualities which allow satisfactory application by machine, professional or amateur, and at the same time seeking the bonus of reduced solvent content. The problems are particularly serious with paints applied industrially as fire risks, toxicity risks and disposal of volatalised solvents are more troublesome than paints applied in the open air.

The paint and resin industry has already put vast research effort in the problem as above stated as evidenced by, for example, the Feb. 18, 1980, issue of the American Paints and Coatings Journal relating to gloss paints at page 56. This refers (with the latex, water soluble alkyd, and high solids approaches in mind) to the prospect of paints having more solids, greater viscosity, slower drying, less durability, loss of smooth flow, lack of hardness and gloss, reduced colour availability, inability to cover greasy films or powdery residues, and lower adherence and low temperature sensitivity depending upon the approach taken to reduce solvent content.

Whilst this may be an over-pessimistic assessment the current effort to produce a paint having a low organic solvent content is very extensive. This effort is proceeding along three approaches:

1. Producing paints with a high (80 to 100%) solids content (in which case the solvent is in the range of 20 to zero %).

2. Producing paints based on resins capable of solubilisation or emulsification into a water phase (oil-in-water emulsions) an example of which is the so-called water-soluble alkyd approach.

3. The development of so-called "Latex" paints having emulsion polymerised vinyl and acrylic polymer.

Each of these three aproaches has its own problems and together they give rise to the gloomy prospect reported in the above reference.

Approach No. 1 above produces a very costly paint with undesirable and unnecessarily thick dry coatings. Also, as indicated above, if the alkyd in the paint is made by the said preferred solvent process the paint will contain an undesirably high quantity of a solvent like xylene as a consequence of the high solids.

Approach No. 2 also produces a costly paint as the resins have to be drastically modified to achieve a stable paint. The paint usually has to include a volatile base such as ammonia or an amine which can cause discolouration problems or introduce unwelcome odours. The products usually have defects which can include a low solids content, poor gloss and poor water and alkali resistance, and some organic solvent is commonly still required as a cosolvent.

Approach No. 3 gives very acceptable matt and low gloss paints but has not produced a paint with all the desirable properties held by a conventional gloss paint based, for example, on an alkyd resin and having 65% solids and 35% solvent.

Use of acrylics and vinyls will also tend to increase the cost of the paint and they are totally dependent on unrenewable petroleum sources. Alkyds, on the other hand, may contain a high proportion of oils derived from renewable sources, such as seed oils. This third approach also leads to difficulties of poor gloss, poor flow, thermoplasticity, poor re-coating and poor water, detergent and alkali resistance.

The present invention is initiated on the concept of disregarding the known three approaches above and instead giving consideration to achieving the required goal by turning in the unpredicted direction of water-in-oil paints. Such paints, as known, have their problems. Water-in-oil paints have already been referred to above and they suffer from the problem of reduced dry-coating weight, without achieving any outstanding solvent reduction (typically, a solvent reduction detected in the atmosphere during use of the paint is from 180 p.p.m.—using "conventional" gloss paint—to 130 p.p.m. using the water-extended paint). G.B. 575,448 refers to water-in-oil emulsions but specifically calls for the use of tall oil derivatives.

The present invention provides a paint formulation which is a dispersion of a water phase in an oil phase, said oil phase comprising a polymeric paint vehicle and organic volatiles characterised in that the water content is selected to give a solids level for the formulation of 50% to 75% by weight and which formulation (when adjusted with the said organic volatiles to a viscosity of 4 poise at 20° C.), has an organic volatiles content of less than 22% and preferably in the range of 5 to 20% by weight and the dispersion is stabilised with titanium dioxide.

Whilst the solids are necessarily expressed as a percentage in relation to an adjusted viscosity of 4 poise at 20° C., the actual viscosity can differ from this figure in which event the solids percentage will vary accordingly.

In the absence of water the formulation preferably will have more than 75% non-volatiles when adjusted to 4 poise at 20° C.

Preferably the water content is in the range of 5% to 50% by weight and the water content is also preferably greater than the solvent content.

A preferred vehicle is a water insoluble alkyd resin (preferably having a weighted average molecular size in the range of 50 to 1000 Angstrom) in a volatile organic solvent which is itself of low or zero overall solubility in water, such as mineral spirit (sometimes referred to as petroleum hydrocarbon and white spirit), the vehicle being selected such that its viscosity at 90% solids concentration in a 1:1 by weight mineral spirit/xylene solvent mixture is below 150 poise and preferably below 60 poise at 20° C. thereby to give for said formulation a viscosity of below 8 poise, and preferably 0.6 to 6 poise, at 20° C.

A chosen mineral spirit is a petroleum fraction such as Esso White Spirit 100, taken at 5 to 95% boiling between 160° and 190° C. with an aromatic content of between 20 to 22%.

A chosen xylene is supplied by B. P. Chemicals Ltd. and has a boiling range 137.9° to 140.4° C. and conforms to BS 458/1:1963.

Incorporations or additions may include emulsifying agents and surfactants. Those found to give the best results will be water insoluble and therefore found in the oil phase.

The water-in-oil dispersion may be prepared by starting from an oil-in-water system by adding alkyd/solvent to water until inversion to a water-in-oil system takes place. A dispersion of titanium dioxide in resin may then be incorporated.

The resins, or varnishes, employed may be individual components or blends thereof, or of modified forms, for instance chemical modifications such as thixotropic or polyurethane resins or other modifications especially those designed to improve the drying rate, since low molecular weight high solids resins tend to dry more slowly than those conventionally employed. Other oil or resin types might include vegetable oils, petroleum resins, ester gums and phenolic modified resins and others commonly used in paint formulations.

Titanium dioxide grades employed are those of the rutile type as other types, such as anatase, are less satisfactory. Anatase grades, whilst affording some stabilisation, give poor film properties. Some grades of rutile titanium dioxide such as those designed for use with vinyl polymer emulsion paints and having an acidic surface coating do not generally stabilise the water-in-oil emulsion. Poor film properties are also obtained with uncoated rutile grades such as Kronos R and these, along with pigments such as lithopone, antimony oxide, zinc sulphide, zinc oxide which exhibit similar properties, are excluded from our invention as not being stabilising. Many grades however are satisfactory in stabilising our water-in-oil emulsions and give good gloss and flow in alkyd gloss paints and these include grades such as Tioxide R-CR6, RTC 90, RHD 2 (Tioxide International Limited) Kronos RN 63 (N.L. Chemicals UK Limited) Tiona RH 472 (Laporte Industries Limited) and many other rutile grades.

It is also found that the amount of titanium dioxide present has an effect on the degree of stability of water-in-oil emulsions and levels in the range 5-40% (by weight) of the total paint formulation are effective, but these figures may be variable depending on the chosen alkyd. Pigmenting material may be present in addition to stabilising titanium dioxide. Emulsifying agents found useful in assisting the formation of water-in-oil emulsion have been found to be surfactants having a HLB (hydrophilic/lyophilic balance) valve below 5. Typical of these are amongst a range of octyl or nonyl phenol-polyethylene glycol condensates sold under the name of Triton (Rohm & Haas Limited). However the invention provides many formulations which are stable without organic surfactants or emusifying agents. Other surfactants are mentioned in the Examples below. The various vehicles referred to in the Examples are indicated by letters as defined hereafter.

In the Examples, which are all adjusted to a viscosity of 4 poise at 20° C., the quantities given are by weight. Each Example is followed by the relative proportions, also by weight, of solids, organic volatiles and water.

EXAMPLE I

| White Gloss Paint | |
|---|---|
| Titanium Dioxide | 279.0 |
| Bentone Paste (10% NV) | 10.9 |
| Vehicle 'A' (100% NV) | 397.4 |
| Methyl Ethyl Ketoxime | 0.84 |
| Calcium as Naphthenate (5%) | 7.95 |
| Cobalt as Naphthenate (8%) | 3.70 |
| Lead as Naphthenate (36%) | 6.60 |
| White Spirit | 120.0 |
| Water | 216.0 |
| Solids | 66.0% |
| Organic Volatiles | 13.3% |
| Water | 20.7% |

EXAMPLE II

| White Undercoat/Flat Finish | |
|---|---|
| Titanium Dioxide | 702.0 |
| Whiting | 1755.0 |
| Bentone 38 | 17.3 |
| Vehicle 'B' (75% NV) | 646.0 |
| Cobalt as Octoate (8%) | 8.9 |
| Calcium as Octoate (10%) | 4.8 |
| Lead as Octoate (36%) | 36.7 |
| Methyl Ethyl Ketoxime | 3.8 |
| Water | 1192.0 |
| White Spirit | 305.0 |
| Isopropanol | 95.0 |
| Solids | 62.8% |
| Organic Volatiles | 12.2% |
| Water | 25.0% |

EXAMPLE III

| White Gloss Paint | |
|---|---|
| Titanium Dioxide | 297.0 |
| Vehicle 'C' (100% NV) | 424.0 |
| Methyl Ethyl Ketoxime | 0.9 |
| Lead (4.38%) + Cobalt (1.9% as Naphthenate in linseed oil | 16.9 |
| Water | 250.0 |
| Solids | 74.7% |
| Organic Volatiles | Nil |
| Water | 25.3% |

EXAMPLE IV

| Coral Pink Gloss Paint | |
|---|---|
| Titanium Dioxide | 80.9 |
| B-Oxynaphtha Arylamide Red | 15.4 |
| Yellow Oxide | 13.6 |
| Arylamide 10G Yellow | 18.2 |
| Vehicle 'D' (95% NV) | 336.3 |
| Bentone Paste (10%) | 6.8 |
| Cobalt as Octoate (8%) | 3.0 |
| Lead as Octoate (36%) | 5.3 |
| Calcium as Octoate (10%) | 3.2 |
| Methyl Ethyl Ketoxime | 0.5 |
| Water | 120.0 |
| White Spirit | 100.0 |
| Solids | 64.7% |
| Organic Volatiles | 18.2% |
| Water | 17.1% |

EXAMPLE V

| White Gloss Paint | |
|---|---|
| Titanium Dioxide | 93.0 |
| Vehicle 'E' (100% NV) | 132.5 |
| Lead/Cobalt Naphthenate in linseed oil | 5.3 |
| Reactive diluent, QM657 (Rohm & Haas) | 22.0 |
| Methyl Ethyl Ketoxime | 0.3 |
| White Spirit | 34.0 |
| Water | 72.0 |
| Dipentene | 11.0 |
| Solids | 68.3% |
| Organic Volatiles | 12.3% |
| Water | 19.4% |

EXAMPLE VI

| White Thixotropic Gloss Paint | |
|---|---|
| Titanium Dioxide | 152.0 |
| Vehicle 'F' (90% NV) | 200.0 |
| Thixotropic Resin Gelkyd 320 (50% NV) (CVP Ltd.) | 40.0 |
| Cobalt as Octoate (8%) | 2.0 |
| Lead as Octoate (36%) | 3.3 |
| Calcium as Octoate (10%) | 2.0 |
| Methyl Ethyl Ketoxime | 0.6 |
| Water | 160.0 |
| White Spirit | 57.6 |
| Solids | 57.7% |
| Organic Volatiles | 16.4% |
| Water | 25.9% |

EXAMPLE VII

| White Gloss Paint | | |
|---|---|---|
| Water | 175.0 | ⎫ This could be formed |
| Vehicle 'G' (100% NV) | 312.0 | ⎬ directly or by an |
| Sorbitan Trioleate | 3.0 | ⎭ inversion technique to form water-in-oil emulsion. |
| Titanium Dioxide | 218.0 | ⎫ Dispersed into a |
| Bentone Paste (10% NV) | 8.5 | ⎬ portion of the above emulsion and diluted with the remainder. |
| Calcium as Octoate (10%) | 3.1 | |
| Cobalt as Octoate (8%) | 2.9 | |
| Lead as Octoate (36%) | 5.2 | |
| Methyl Ethyl Ketoxime | 0.8 | |
| White Spirit | 111.0 | |
| Solids | 64.4% | |
| Organic Volatiles | 14.8% | |
| Water | 20.8% | |

EXAMPLE VIII

| White Eggshell Paint | |
|---|---|
| Titanium Dioxide | 145.1 |
| Micronised Talc | 43.0 |
| Vehicle 'H' (66% NV) | 143.7 |
| Aluminium Naphthenate (0.4% Al) | 12.4 |
| Bentone Paste (10% NV) | 23.6 |
| Calcium as Octoate (10%) | 2.3 |
| Co Zirc 69 Drier | 2.6 |
| Methyl Ethyl Ketoxime | 0.3 |
| Water | 68.0 |
| Solids | 65.1% |
| Organic Volatiles | 19.5% |
| Water | 15.4% |

EXAMPLE IX

| White Air Drying/Stoving Gloss Paint | |
|---|---|
| Titanium Dioxide | 70.0 |
| Bentone Paste (10%) | 2.7 |
| Vehicle 'J' (80% NV) | 100.0 |
| Cymel 303 (Hexamethoxy Methyl Melamine) | 20.0 |
| Amino Methyl Propanol Salt of p-Toluene Sulphonic Acid | 2.0 |
| Methyl Ethyl Ketoxime | 0.25 |
| Calcium as Octoate (10%) | 1.00 |
| Cobalt as Octoate (8%) | 0.94 |
| Lead as Naphthenate (36%) | 1.66 |
| Water | 56.0 |
| White Spirit | 24.0 |
| Solids | 62.6% |

-continued

| White Air Drying/Stoving Gloss Paint | |
|---|---|
| Organic Volatiles | 17.3% |
| Water | 20.1% |

EXAMPLE X

| Wood Primer | |
|---|---|
| Titanium Dioxide | 89.0 |
| Barytes | 99.5 |
| China Clay | 62.8 |
| Whiting | 280.0 |
| Bentone 38 | 5.2 |
| Vehicle 'K' (70% NV) | 329.7 |
| Cobalt as Octoate (8%) | 4.9 |
| Lead as Octoate (36%) | 8.7 |
| Calcium as Octoate (10%) | 2.6 |
| Methyl Ethyl Ketoxime | 1.0 |
| Water | 200.0 |
| White Spirit | 120.0 |
| Solids | 64.6% |
| Organic Volatiles | 18.8% |
| Water | 16.6% |

EXAMPLE XI

| Zinc Phosphate Primer | |
|---|---|
| Talc | 842.0 |
| Zinc Phosphate | 1684.0 |
| Titanium Dioxide | 777.0 |
| Bentone Paste (10%) | 280.0 |
| Vehicle 'L' (90% NV) | 3918.0 |
| Shellsol E | 175.0 |
| Lead as Octoate (36%) | 75.0 |
| Cobalt as Octoate (8%) | 16.6 |
| Methyl Ethyl Ketoxime | 11.7 |
| Water | 1155.0 |
| White Spirit | 906.0 |
| Sulphonated Castor Oil | 5.7 |
| Lissapol NX | 1.4 |
| Solids | 70.3% |
| Organic Volatiles | 18.0% |
| Water | 11.7% |

EXAMPLE XII

| Industrial Coating for Steel | |
|---|---|
| Titanium Dioxide | 149.0 |
| Vehicle 'M' (80% NV) | 219.5 |
| Floated Silica | 1.6 |
| Cellosolve Acetate | 13.0 |
| p-Toluene Sulphonic Acid | 0.56 |
| Solvesso 150 | 54.0 |
| Water | 132.9 |
| Solids | 63.0% |
| Organic Volatiles | 15.0% |
| Water | 22.0% |

EXAMPLE XIII

| White Gloss Paint | | |
|---|---|---|
| Titanium Dioxide | 70.0 | |
| Linseed Stand Oil (85% NV) | 78.4 | } Vehicle |
| Rosin Modified Phenolic Resin (50% NV) | 66.6 | |
| Bentone Paste | 2.7 | |
| Cobalt as Octoate | 0.94 | |
| Lead as Octoate | 1.66 | |
| Calcium as Octoate | 1.0 | |

-continued

| White Gloss Paint | |
|---|---|
| Methyl Ethyl Ketoxime | 0.25 |
| Water | 66.0 |
| White Spirit | 6.0 |
| Solids | 58.7% |
| Organic Volatiles | 18.8% |
| Water | 22.5% |

Now follows the definition of the various Vehicles A to M. The abbreviation "NV" indicates "non-volatiles".

| VEHICLE REFERENCE | FORMULATION | | REMARKS |
|---|---|---|---|
| A. | Alkyd Part | | |
| | Soya Bean Oil | 2697 | This is a 100% |
| | Pentaerythritol | 309 | NV alkyd. |
| | Iso-Phthalic Acid | 467 | |
| | Solvent Part | Nil | |
| | Acid Value 2.4 mg KOH | | |
| | Viscosity 18.5 poise | | |
| B. | Alkyd Part | | |
| | Soya Bean Oil | 2075 | |
| | Pentaerythritol | 226 | |
| | Glycerol | 206 | |
| | o-Phthalic Anhydride | 778 | |
| | Solvent Part | | |
| | White Spirit | 1095 | |
| | Acid Value 2.4 mg KOH | | |
| | Viscosity 9.7 poise | | |
| C. | Alkyd Part | | This is a 100% |
| | | | NV alkyd (made by |
| | Linseed Oil | 2697 | a xylene-free |
| | Pentaerythritol | 226 | fusion process) |
| | Iso-Phthalic Acid | 409 | and 212 parts of |
| | | | the formulation |
| | Solvent Part | Nil | are taken together |
| | | | with 212 parts of |
| | Acid Value 5.2 mg KOH | | boiled linseed oil |
| | Viscosity 65 poise | | to give Vehicle 'C'. |
| D. | Alkyd Part | | |
| | Soya Bean Oil | 730 | |
| | Pentaerythritol | 80 | |
| | o-Phthalic Anhydride | 190 | |
| | Solvent Part | | |
| | White Spirit | 52.5 | |
| | Acid Value ≯ 12 mg KOH | | |
| | Viscosity 20 poise at 90% NV | | |
| E. | Alkyd Part | | This is a 100% |
| | | | NV alkyd. |
| | This is a commercial | | |
| | Cray Valley Product | | |
| | Alkyd E2801, based on | | |
| | terephthalic acid. | | |
| | Solvent Part | Nil | |
| | Acid Value 2.5 mg KOH | | |
| | Viscosity 71 poise | | |
| F. | Alkyd Part | | This is hot |
| | | | blended with |
| | Soya Bean Oil | 3269 | thixotropic |
| | Pentaerythritol | 325 | resin (see |
| | Iso-Phthalic Acid | 650 | Example VI). |
| | Solvent Part | | |
| | White Spirit | 470 | |
| | Acid Value ≯ 10 mg KOH | | |
| | Viscosity 2.5 poise | | |
| G. | Alkyd Part | | This is a 100% |
| | | | NV alkyd. |
| | Soya Oil Fatty Acids | 750 | |
| | Pentaerythritol | 70 | |

-continued

| VEHICLE REFERENCE | FORMULATION | | REMARKS |
|---|---|---|---|
| | o-Phthalic Anhydride | 180 | |
| | Solvent Part | Nil | |
| | Acid Value ≯ 15 mg KOH | | |
| | Viscosity 30 poise | | |
| H. | Alkyd Part | | This alkyd is 65% NV. |
| | Soya Bean Oil | 480 | |
| | Pentaerythritol | 156 | |
| | o-Phthalic Anhydride | 240 | |
| | Solvent Part | | |
| | White Spirit | 470 | |
| | Acid Value ≯ 10 mg KOH | | |
| | Viscosity 7 poise | | |
| J. | Alkyd Part | | Blended with Cymel 303 (see Example IX). |
| | Soya Bean Oil | 730 | |
| | o-Phthalic Anhydride | 191 | |
| | Pentaerythritol | 102 | |
| | Solvent Part | | |
| | White Spirit | 250 | |
| | Acid Value 5.1 mg KOH | | |
| | Viscosity 10.8 poise | | |
| K. | Alkyd Part | | To this is added linseed stand oil (7.5 poise at 80% NV) 135.4 parts. |
| | Soya Bean Oil | 88.8 | |
| | Pentaerythritol | 7.5 | |
| | o-Phthalic Anhydride | 23.2 | |
| | Solvent Part | | |
| | White Spirit | 74.7 | |
| | Acid Value ≯ 10 mg KOH | | |
| | Viscosity 10 poise | | |
| L. | Alkyd Part | | |
| | Soya Bean Oil | 500 | |
| | Pentaerythritol | 170 | |
| | o-Phthalic Anhydride | 260 | |
| | Solvent Part | | |
| | White Spirit | 100 | |
| | Acid Value < 10 mg KOH | | |
| | Viscosity 25 poise | | |
| M. | Alkyd Part | | 182.3 parts are taken to which 37.2 parts of Cymel 303 are added to give Vehicle 'M'. |
| | Norsolyde HS 602 80% NV in Solvesso | 150 | |
| | Solvent Part | Nil | |
| | Acid Value 10 mg KOH | | |
| | Viscosity 90 poise | | |

Comparisons are now given to demonstrate the difference in maximum theoretical concentrations of organic solvents in the atmosphere of various paint formulations, including one (Formulation X) according to the invention and others (Formulations Y1, Y2 and Y3) not in accordance. Formulation X has a solids content of 70%, and contains 8% volatile organic solvent and 22% of water. Specimen Y1 is a conventional quality gloss paint of 68% solids and 32% volatile organic solvent. Specimen Y2 is a conventional quality gloss paint extended with water to have a water content of 31% and 25% volatile organic solvent; and Specimen Y3 is a high solids gloss paint of 90% NV (non-volatiles) and 10% volatile organic solvent. As has been mentioned above, in the manufacture of alkyd resins a proportion of xylene (approximately 4% on total solid resin) is normally used to assist in the processing and residual xylene customarily remains as an organic volatile.

The comparisons given below indicate the maximum theoretical (calculated) level of white (mineral) spirit and of xylene which would be present in a test room of 25 cubic meters volume at 25° C. when a 300 g sample of each paint was applied in separate experiments.

| | FORMULATION | | | |
|---|---|---|---|---|
| | X | Y1 | Y2 | Y3 |
| Total NV % | 70 | 68 | 44 | 90 |
| Total organic solvent % | 8 | 32 | 25 | 10 |
| Water % | 22 | — | 31 | — |
| Solid Medium % | 41 | 40 | 26 | 53 |
| % Xylene | 1.64 | 1.60 | 1.04 | 2.12 |
| % White Spirit | 6.36 | 30.4 | 23.96 | 7.88 |
| Xylene p.p.m. | 59 | 58 | 38 | 76 |
| White Spirit p.p.m. | 173 | 831 | 655 | 215 |

It can be clearly seen that Formulation X is capable of releasing very significantly less white spirit into the atmosphere than the high quality conventional paint (Formulation Y1) with which it compares favourably for cost, quality and performance. Formulation X, with its high quality, is also capable of releasing much less white spirit than the relatively poor quality (low solids) water extended paint (Formulation Y2).

The white spirit release capability of Formulation X is like (although less than) that of Formulation Y3 but, of course, it does not suffer from those disadvantages possessed by Formulation Y3 and as referred to above (see "Approach No. 1"). Further, Formulation X has a significantly lower xylene release capability than Formulation Y3.

Experiments have been carried out to determine the actual organic solvent content in the atmosphere when using Formulations X, Y1 and Y2 above. Whilst the experiments cannot give precise results the analysis of results using "Accuhaler" equipment; a Draeger hand pump; and a Draeger "Polymeter" whilst brush applying the formulation in a 25 cubic meter test room at 25° C., give respective measurements of 35 p.p.m., 142 p.p.m., and 117 p.p.m., these being consistent with the theoretical figures.

Thus it is seen that the invention provides a stable water-in-oil alkyd vehicle paint of a quality comparable to known high quality paints whilst having a convenient and conventional solids content (50–75%) of a good quality paint and a convenient and conventional viscosity (below 8 poise at 20° C.) and a low (less than 20%) organic solvent content.

The conventional solids content ensures that the paint does not have a xylene content in excess of that of known high quality paints and further ensures the expected cover and film thickness in the dried paint film.

The conventional viscosity ensures smooth application of the paint by conventional operations.

The low solvent content facilitates formulations to meet all present and foreseen legislation and yet maintains quality comparable to current good quality alkyd paints which hitherto has been an unattainable goal.

In the Examples given above, and generally, the mixing of vehicle and water can be a simple stirring operation. The Examples also show how the invention is applicable to a wide variety of paint styles, including white and many coloured paints of gloss, eggshell and undercoat type which may or may not be thixotropic and also applicable to industrial paints.

It is also relevant to note that the invention allows the metal ions (cobalt, lead, calcium, etc.) commonly used as driers to be incorporated in the water additions by selecting water soluble salts, e.g. cobalt acetate. This could reduce the cost of the drier. Pigments could also be included in the dispersed aqueous phase.

The invention appears only to have limitation, as currently seen, that it may not have application to certain strong coloured paints where the pigmentation effect of the stabilising titanium dioxide would not be acceptable.

Paints having water dispersed in a continuous organic phase are not in themselves new and in this respect reference has already been made to GB Patent Specification No. 575,448 and reference is also made to Vol. 29, January 1957, No. 384 Official Digest (Federation of Paint and Varnish Production Clubs). The paints therein disclosed do not possess the overall properties attributable to paints according to the invention and their contents are not as referred to in the present invention.

The invention will now be described further with reference to the accompanying drawings in which:

FIG. 1 is a comparative drawing made from photomicrographs showing the structure of paint according to the invention compared with paint of similar formulation but lacking stabilising titanium dioxide; and FIG. 2 is a graph comparing molecular size distribution in units of $10^{-9}$ meters as determined by gel permeation chromatography (horizontal axis) of a known paint vehicle with a vehicle as used in the invention. The units of the vertical axis are "% Peak Height".

In FIG. 1 (top left-hand corner) the resin continuous phase is indicated by the numeral 10, the dispersed water phase by globules having the numeral 11, and titanium dioxide pigment by the numeral 12. The dispersed water phase has remarkable size uniformity. The pigment has an affinity for the surface of the water globules and has a stabilising effect. The water is very uniformly distributed and this is conveyed to the pigment to give great stability and homogeniety to the paint. In general the dispersion can be achieved without the use of added surfactants but can sometimes be aided with surfactants. In the bottom right-hand corner the resin phase is indicated by the numeral 20, the dispersed water phase by globules 21 and a pigment (such as zinc sulphide, antimony oxide or lithopone) by the numeral 22.

It is seen that the pigment 22 has only a partial affinity to the water globules 21 and that the globules 21 are large and can vary very greatly in size (even greater than the drawing shows). This structure is found not to possess satisfactory stability and the components would separate out on storage.

In FIG. 2 the graph B relates to a typical vehicle used in conventional paints. The other graph marked 'A' refers to vehicle 'A' as used in the invention above. The low molecular size peakiness of graph 'A' is apparent and characterises the high solids vehicles used in the invention.

In an ideal situation the molecular size of a given polymer type determines the solids levels of solutions at a given viscosity. Practical commercial paint polymers comprise a range of molecular sizes and other factors such as chemical polarity influence the solids in their solutions. Known general use paints of conventional solids are produced from vehicles with a molecular size (measured in Angstrom units) of 1000 upwards. Paint formulations according to the invention have prime vehicles with a molecular size of less than 1000 Angstroms and often of only about 400 to 700 Angstroms.

Whilst the examples above show the use of vehicles based on alkyds, or alkyd blends or polyesters, other bases can be used as an acrylic or a non-drying alkyd with, if required, a cross-linking resin such as a melamine, or the vehicle can be an epoxy resin to which an amine or polyamide is subsequently added.

The volatile content of the final formulation, that is the water and the solvent, is selected so that a major part or all of the solvent part is slower evaporating than the water.

We claim:

1. A paint formulation which is a dispersion of a water phase in an oil phase, said oil phase comprising a polymeric paint vehicle and organic volatiles characterised in that the water content is selected to give a solids level for the formulation of 50% to 75% by weight and which formulation (when adjusted to a viscosity of 4 poise at 20° C. with the said organic volatiles) has an organic volatiles content of less than 22% by weight and the dispersion is stabilised with titanium dioxide.

2. A formulation according to claim 1 characterised in that the water content is in the range of 5% to 50% by weight.

3. A formulation according to claim 2 in which the water content is greater than the solvent content.

4. A formulation according to claim 1, 2 or 3 characterised in that the said vehicle is selected such that its viscosity at 90% solids concentration in a 1:1 by weight mineral spirit/xylene solvent mixture is below 150 poise at 25° C. thereby to give for said formulation a viscosity of below 8 poise at 20° C.

5. A formulation as claimed in claim 4 wherein said formulation viscosity is 0.6 to 6 poise at 20° C.

6. A formulation as claimed in claim 4 wherein said vehicle viscosity is below 60 poise.

7. A formulation according to claim 1 characterised in that said polymeric paint vehicle comprises resin having weighted average molecular size in the range of 50 to 1000 Angstrom.

8. A formulation according to claim 1 characterised in that the water phase is present as homogeneously dispersed substantially uniform sized globules to which stabilising titanium dioxide particles are attached.

9. A formulation according to claim 8 characterised in that the titanium dioxide is present in the range of 5% to 40% by weight.

10. A formulation according to claim 9 characterised by the incorporation of pigment material other than said titanium dioxide.

11. A formulation according to claim 8 characterised by the absence of any organic surfactant or emulsifying agent to stabilise the dispersion.

12. A method of making a paint formulation according to claim 1 comprising:

taking a polymeric paint vehicle, which vehicle is insoluble in water but soluble in volatile organic solvent of low or zero overall solubility in water, the vehicle having an overall viscosity at 90% solids concentration in a 1:1 by weight mineral spirit/xylene solvent mixture below 150 poise at 25° C. and sequentially incorporating water and stabilising rutile titanium dioxide, either followed by the other, to give a final paint formulation which is a dispersion of a water phase in an oil phase stabilised by said titanium dioxide in which the solids of said formulation is between 50% to 75% and so provide a product having not more than 22% organic volatiles content, the remaining volatile content being substantially water and the paint formulation so formed having a viscosity below 8 poise at 20° C.

13. A method according to claim 12 in which, in the absence of water, the formulation has more than 75% non-volatiles when adjusted to 4 poise at 20° C. with the said volatile organic solvent.

14. A method as claimed in claim 12 wherein said vehicle comprises an alkyd resin, oleoresinous varnish or other surface coating resin, said vehicle viscosity is below 60 poise at 25° C., and said formulation viscosity is 0.6 to 6.0 poise at 20° C.

15. A formulation as claimed in claim 1 wherein the organic volatiles content is in the range of 5% to 20% by weight.

* * * * *